(12) United States Patent
Stumpf et al.

(10) Patent No.: US 6,485,240 B2
(45) Date of Patent: Nov. 26, 2002

(54) WELD JOINT BETWEEN THERMOPLASTIC STRUCTURAL AND FASTENING MEMBERS

(75) Inventors: Michael Stumpf, Bielefeld (DE); Detlef Schulz, Bielefeld (DE)

(73) Assignee: Bollhoff GmbH, Bielefeld (DE)

( * ) Notice: Subject to any disclaimer, the term of this patent is extended or adjusted under 35 U.S.C. 154(b) by 0 days.

(21) Appl. No.: 09/803,694

(22) Filed: Mar. 9, 2001

(65) Prior Publication Data

US 2001/0024606 A1 Sep. 27, 2001

(30) Foreign Application Priority Data

Mar. 16, 2000 (DE) .......................................... 100 12 782

(51) Int. Cl.⁷ .............................................. F16B 37/06
(52) U.S. Cl. ........................ 411/171; 411/82; 228/114.5
(58) Field of Search .......................... 411/171, 82, 930; 403/270; 228/114.5

(56) References Cited

U.S. PATENT DOCUMENTS

| | | | |
|---|---|---|---|
| 2,583,868 A | * | 1/1952 | Mocium |
| 3,444,018 A | * | 5/1969 | Hewitt |
| 3,883,256 A | * | 5/1975 | Schmidt |
| 4,087,038 A | * | 5/1978 | Yagi |
| 4,523,710 A | * | 6/1985 | Renshaw |
| 4,832,549 A | * | 5/1989 | Shibayama |
| 5,054,980 A | * | 10/1991 | Bidefeld |
| 5,069,574 A | | 12/1991 | Mikeska |
| 5,407,311 A | * | 4/1995 | Goss |
| 5,752,725 A | * | 5/1998 | El-Sobky |
| 5,782,575 A | | 7/1998 | Vincent et al. |
| 5,879,115 A | * | 3/1999 | Medal |

FOREIGN PATENT DOCUMENTS

| | | |
|---|---|---|
| DE | 2115434 | 10/1971 |
| DE | 9212434 | 7/1993 |
| DE | 3509445 | 9/1994 |
| DE | 4423576 | 1/1995 |
| DE | 9649414 | 6/1997 |
| DE | 9716676 | 10/1998 |
| DE | 29714018 | 12/1998 |
| DE | 7936585 | 11/2000 |
| EP | 226094 | 11/1986 |

OTHER PUBLICATIONS

Ruland, Rugen thermoplastischer Werkstucke durch Ultraschall Werkstatt und Betrieb 108, 1975, 7, pp. 459–460.
Bethleham, W., ReibschweiBen unterscheidlicher Werkstoffe spart erheblich Kosten, Maschinenmarkt, Wurzburg 90, 1984, 103–4.
Patents Abstract of Japan—3–24306 (A), M–1102, Apr. 12, 1991, vol. 15/No. 146.
Patents Abstracts of Japan, 3–169533 (A), M–1169, Oct. 17, 1991, vol. 15/No. 407.

* cited by examiner

Primary Examiner—Flemming Saether
(74) Attorney, Agent, or Firm—Seyfarth Shaw

(57) ABSTRACT

A joining assembly for mounting a fastening element of thermoplastic material to an external surface of a structural member of thermoplastic material. The fastening element and the structural member are provided with a joining projection and, respectively, a joining extension have matingly shaped joining surfaces which are integrally joined to each other by melting.

10 Claims, 2 Drawing Sheets

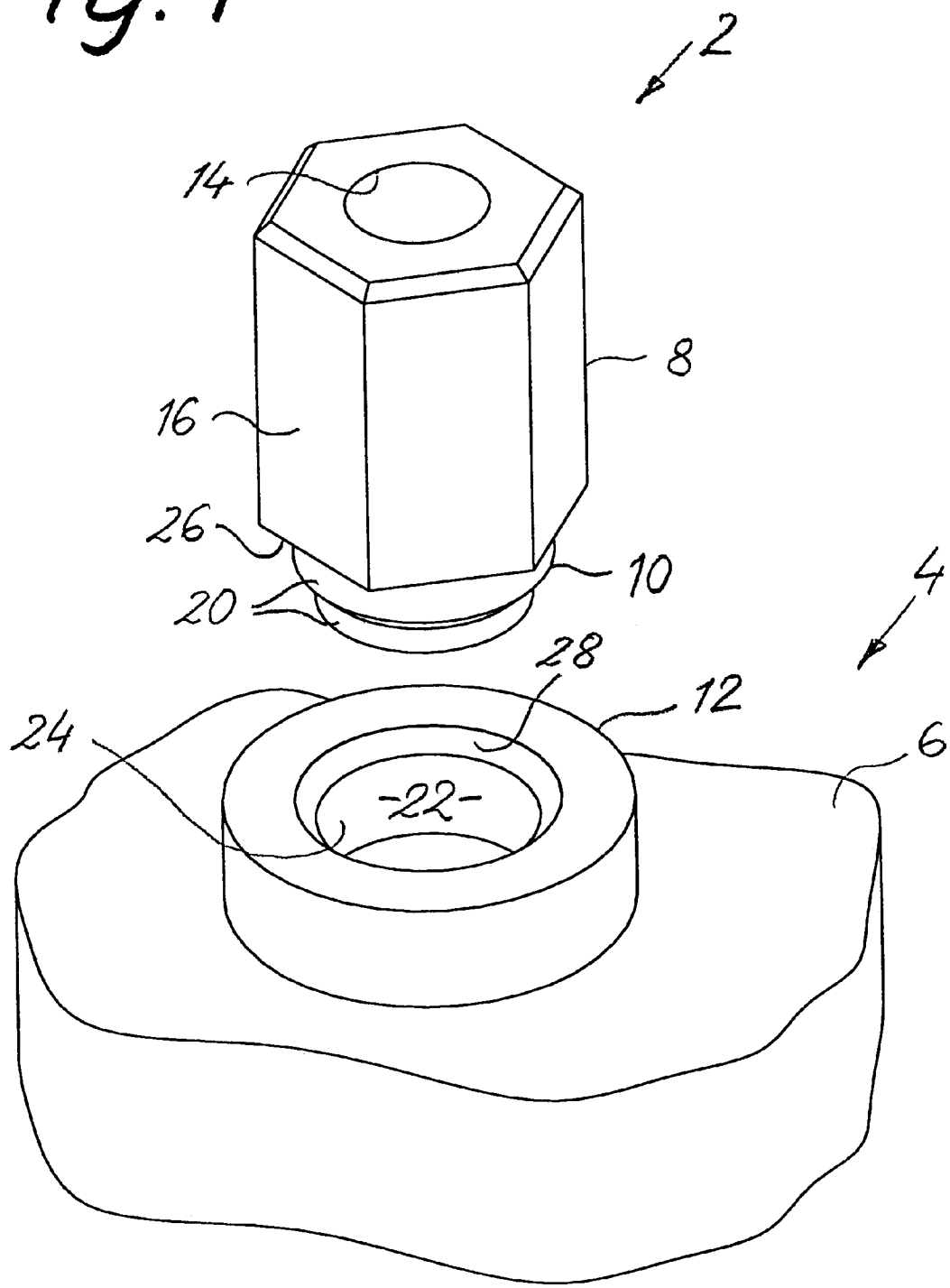

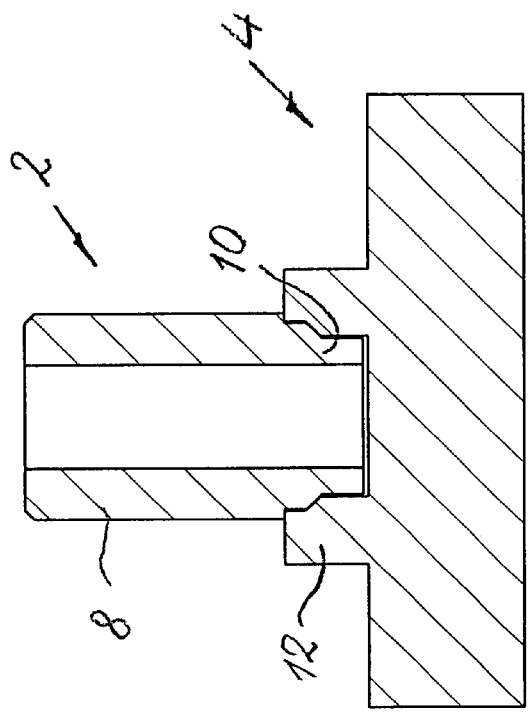
Fig. 4
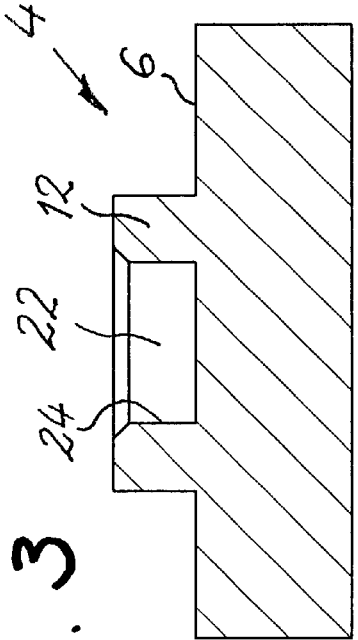
Fig. 2
Fig. 3

WELD JOINT BETWEEN THERMOPLASTIC STRUCTURAL AND FASTENING MEMBERS

BACKGROUND OF THE INVENTION

The present invention relates to a joining assembly for mounting a fastening element of thermoplastic material to a structural member of thermoplastic material.

Quite often it is necessary to have structural members of plastics such as plastic housings provided with fixing means enabling to mount other members to said structural members. To this end it has become known for example to press threaded inserts of a harder plastic material into respective openings of the structural members, for example by a hot melt operation, ultrasonic welding or the like. This method, however, cannot be used with thin-walled structural members such as housings of mobile telephones (cellular phones). One possibility would be to provide the structural member with an integral threaded projection by injection moulding. However this is possible only with structural members of very simple geometrical shape.

SUMMARY OF THE INVENTION

It is a general object of the invention to provide an improved joining assembly for mounting a fastening element of thermoplastic material to an external surface of a structural member of thermoplastic material, which avoids the disadvantages of prior joining assemblies while affording additional structural and operating advantages.

It is a further object of the invention to provide a joining assembly which allows to mount a fastening element to a structural member after the structural member has been manufactured even though no opening in the external surfaces of the structural member is required to mount the fastening element to the structural member.

The joining assembly of the present invention comprises a fastening element having a main body provided with functional means and a joining projection integral with said main body. The structural member is provided with a joining extension integral with the external surface of the structural member and having a receiving opening for receiving the joining projection of the fastening element. The joining projection and the joining extension have matingly shaped joining surfaces which are integrally joined to each other by melting.

This allows to mount the fastening element to the external surface of the structural member so as to be integral therewith without the need to have the walls of the structural member provided with a bore, recess or the like. The fastening element may be a simple element made by injection moulding.

For integrally joining the fastening element and the structural member a conventional melting method such as ultrasonic welding or linear or rotation friction welding may be used. The fastening element and the structural member may be made of the same thermoplastic material or of different thermoplastic materials which are compatible with each other. To this end partially crystalline or amorphous thermoplastic materials, along with conventional fillers if desired, may be used.

BRIEF DESCRIPTION OF THE DRAWINGS

For the purpose of facilitating an understanding of the invention, there is illustrated in the accompanying drawing a preferred embodiment thereof, from an inspection of which, when considered in connection with the following description, the invention, its construction and many of its advantages should be readily understood and appreciated.

FIG. 1 is a perspective view of a fastening element, and a portion of an associated structural member prior to a joining operation;

FIG. 2 is a longitudinal section of the fastening element in FIG. 1;

FIG. 3 is a longitudinal section of the structural member in FIG. 1;

FIG. 4 is a longitudinal section of the fastening element and the structural member after a joining operation.

DESCRIPTION OF THE PREFERRED EMBODIMENT

FIG. 1 shows a fastening element 2 which is to be mounted to a planar external surface 6 of a structural member 4. The structural member 4 is a thin-walled member such as a housing of a mobile telephone (cellular phone). The fastening element 2 comprises a main body 8 and a joining projection 10 which is integral with the main body and which will be received from a joining extension 12 integral with the external surface 6 of the structural member 4.

The fastening element 2 has functional means 14 comprising for example a smooth or threaded bore or a part of a closure or snapping means or similar fastening means. In view thereof, the fastening element 2 may perform a respective fastening function when it has been mounted to the external surface 6 of the structural member 4.

The joining projection 10 of the fastening element 2 and the joining extension 12 of the structural member 4 are provided with matingly shaped joining surfaces 20, 24 which are joined to each other by a melting operation. The melting operation may be a conventional welding method such as ultrasonic welding or linear or rotation friction welding (vibration welding) or welding by a heat element or the like. The fastening element 2 and the structural member 4 each are made of a thermoplastic material which enables a respective joining operation. To this end, they may be made of the same plastic material or of different plastic materials which are compatible to each other.

In the embodiment as shown the joining surfaces 20 and 24 are formed so as to be symmetrical with respect to an axis of rotation. More precisely, the joining projection 10 is a substantially cylindrical trunnion the external peripheral surface of which is used as the joining surface 20. The joining extension 12 is a cylindrical annular member having a receiving opening 22 the peripheral surface of which serves as the joining surface 24. As shown in FIGS. 1 to 3 the joining surface 20 is of stepped configuration while the joining surface 24 is smooth. It should be noted that the joining surface 20 could be smooth and the joining surface 24 could be of stepped configuration. Furthermore single or multiple steps of the joining surfaces are encompassed by the invention. Instead of using cylindrical joining surfaces 20 and 24 they could be of tapered or conical shapes.

The axial extension and the diameter of the joining surfaces 20, 24 are matingly selected such that the joining operation will result in a perfect joint between the joining surfaces. As shown in FIGS. 1, 2 and 4 the main body 8 of the fastening element 2 is of a larger external diameter than the joining projection 10 so as to provide for an abutment surface 26 between the main body 8 and the joining projection 10 to be engaged by the end face of the joining extension 12 during and after the joining operation.

As shown in FIGS. 1 and 3 the joining extension 12 has, at the free end of the receiving opening 22, a chamfer 28 which facilitates insertion of the joining projection 10 into the receiving opening 22 of the joining extension 12.

The joining assembly comprising the fastening element 2 and the structural member 4 as shown in FIG. 4 is manufactured as follows:

Initially the fastening element 2 and the structural member 4 are manufactured separately from each other, for example by injection moulding. As already mentioned the fastening element 2 and the structural member 4 may be made of thermoplastic materials which include fillers if desired. The thermoplastic materials may be partially crystalline or amorphous thermoplastic materials.

Thereafter the joining projection 10 of the fastening element 2 is inserted into the receiving opening 22 of the joining extension 12 of the structural member 4. The joining surfaces 22 and 24 are heated by relative movements therebetween such that the plastics material will be plastified. When the relative movements will have been terminated, the melted material will become rigid to provide for an integral joint between the fastening element 2 and the structural member 4 in the area of the joining surfaces 20, 24.

The above mentioned relative movements between the joining surfaces may be obtained for example by ultrasonic welding or by linear or rotating vibrations (friction welding). In the case of rotating vibrations the main body 8 of the fastening element 2 has its outer periphery provided with drive means 16 comprising for example a polygonal (hexagonal) cross-section of the fastening element 2 as shown in the drawings. Instead of using a polygonal cross-section of the fastening element other drive means such as a non-circular cross-section, toothings, a profiled cross-section or similar drive means may be used. Alternatively the drive means can be provided within the main body 8 which however would result in enlarged external dimensions of the main body 8. It is to be noted that drive means 16 are not required when the melting operation comprises linear relative movements (i.e. parallel to the longitudinal axis of the fastening element 2) between the joining surfaces; in this case the main body 8 could have a cylindrical or differently shaped external surface.

We claim:

1. A joining assembly for mounting a fastening element of thermoplastic material to an external surface of a structural member of thermoplastic materials, wherein said fastening element comprises a main body provided with functional means and a joining projection integral with said main body, said structural member has, at said external surface, a joining extension provided with a receiving opening for receiving and joining projection of said fastening element, and said joining projection and said joining extension have a common axis and matingly shaped joining surfaces which are integrally joined to each other by melted thermoplastic material thereof, said matingly shaped joining surfaces being of circumferentially smooth shape and one of said matingly shaped joining surfaces being of axially stepped configuration.

2. The joining assembly of claim 1 wherein said fastening element and said structural member are made of the same thermoplastic material or of different thermoplastic materials which are compatible with each other.

3. The joining assembly of claim 1 wherein said melted thermoplastic material of said joining surface is obtained by ultrasonic welding, linear or rotation friction welding or other hot melting operations.

4. The joining assembly of claim 1 wherein said joining surfaces are symmetrical about a common axis of rotation.

5. The joining assembly of claim 1 wherein said joining extension of said structural member comprises a substantially cylindrical annular member.

6. The joining assembly of claim 1 wherein said joining projection of said fastening element comprises a substantially cylindrical trunnion.

7. The joining assembly of claim 1 wherein a shoulder-like abutment surface is provided between said main body and said joining projection of said fastening element to be engaged by said joining extension.

8. The joining assembly of claim 1 wherein said main body of said fastening element comprises a trunnion-like member having a central longitudinal axis perpendicular to said external surface of said structural member.

9. The joining assembly of claim 8 wherein said main body of said fastening element is provided with drive means to be engaged by rotating melting tool means.

10. The joining assembly of claim 1 wherein said functional means of said fastening element comprise a smooth or tapped bore or closure means or snap means or similar fastening means.

* * * * *